United States Patent
DiGiovanni

(10) Patent No.: US 9,085,946 B2
(45) Date of Patent: Jul. 21, 2015

(54) METHODS OF FORMING POLYCRYSTALLINE COMPACTS HAVING MATERIAL DISPOSED IN INTERSTITIAL SPACES THEREIN, CUTTING ELEMENTS AND EARTH-BORING TOOLS INCLUDING SUCH COMPACTS

(75) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/619,931

(22) Filed: Sep. 14, 2012

(65) Prior Publication Data
US 2013/0008093 A1 Jan. 10, 2013

Related U.S. Application Data

(62) Division of application No. 12/558,184, filed on Sep. 11, 2009, now Pat. No. 8,727,042.

(51) Int. Cl.
*B24D 3/00* (2006.01)
*B01J 3/06* (2006.01)
*E21B 10/55* (2006.01)
(Continued)

(52) U.S. Cl.
CPC . *E21B 10/55* (2013.01); *B24D 3/10* (2013.01); *B24D 99/005* (2013.01); *E21B 10/567* (2013.01)

(58) Field of Classification Search
CPC ............ E21B 10/46; E21B 10/55; B01J 3/06; B24D 3/00
See application file for complete search history.

(56) References Cited

U.S. PATENT DOCUMENTS 3,745,623 A 7/1973 Rocco et al.
4,224,380 A 9/1980 Bovenkerk et al.
(Continued)

FOREIGN PATENT DOCUMENTS

WO 2004078641 A1 9/2004
WO 2006032982 A1 3/2006
(Continued)

OTHER PUBLICATIONS

Arima, Makoto, et al., "Diamond nucleation and growth by reduction of carbonate melts under high-pressure and high-temperature conditions," Geology, vol. 30, No. 8, pp. 691-694, Aug. 2002.
(Continued)

*Primary Examiner* — Pegah Parvini
(74) *Attorney, Agent, or Firm* — TraskBritt

(57) ABSTRACT

Polycrystalline compacts include smaller and larger hard grains that are interbonded to form a polycrystalline hard material. The larger grains may be at least about 150 times larger than the smaller grains. An interstitial material comprising one or more of a boride, a carbide, a nitride, a metal carbonate, a metal bicarbonate, and a non-catalytic metal may be disposed between the grains. The compacts may be used as cutting elements for earth-boring tools such as drill bits, and may be disposed on a substrate. Methods of making polycrystalline compacts include coating smaller hard particles with a coating material, mixing the smaller particles with larger hard particles, and sintering the mixture to form a polycrystalline hard material including interbonded smaller and larger grains. The sizes of the smaller and larger particles may be selected to cause the larger grains to be at least about 150 times larger than the smaller grains.

20 Claims, 3 Drawing Sheets

(51) Int. Cl.
  *B24D 99/00* (2010.01)
  *E21B 10/567* (2006.01)
  *B24D 3/10* (2006.01)

(56) References Cited

U.S. PATENT DOCUMENTS

| | | | |
|---|---|---|---|
| 4,231,195 A | 11/1980 | DeVries et al. | |
| 4,505,721 A | 3/1985 | Almond et al. | |
| 4,610,699 A | 9/1986 | Yazu | |
| RE32,380 E | 3/1987 | Wentorf | |
| 5,011,514 A | 4/1991 | Cho et al. | |
| 5,096,465 A | 3/1992 | Chen et al. | |
| 5,127,923 A | 7/1992 | Bunting et al. | |
| 5,151,107 A | 9/1992 | Cho et al. | |
| 5,205,684 A | 4/1993 | Meskin et al. | |
| 5,370,195 A | 12/1994 | Keshavan et al. | |
| 5,536,485 A | 7/1996 | Kume et al. | |
| 5,954,147 A | 9/1999 | Overstreet et al. | |
| 6,009,963 A | 1/2000 | Chaves et al. | |
| 6,063,149 A | 5/2000 | Zimmer | |
| 6,090,343 A | 7/2000 | Kear et al. | |
| 6,194,481 B1 | 2/2001 | Furman et al. | |
| 6,248,447 B1 | 6/2001 | Griffin et al. | |
| 6,548,264 B1 | 4/2003 | Tan et al. | |
| 6,852,414 B1 | 2/2005 | Frushour | |
| 7,037,583 B2 | 5/2006 | Furman et al. | |
| 7,060,641 B2 | 6/2006 | Qian et al. | |
| 7,070,635 B2 | 7/2006 | Frushour | |
| 7,309,526 B2 | 12/2007 | Smith et al. | |
| 7,396,505 B2 | 7/2008 | Pope et al. | |
| 7,397,558 B2 | 7/2008 | Kamins et al. | |
| 7,493,973 B2 | 2/2009 | Keshavan et al. | |
| 7,510,034 B2 | 3/2009 | Curry et al. | |
| 7,516,804 B2 | 4/2009 | Vail | |
| 7,527,860 B2 | 5/2009 | Chih et al. | |
| 7,556,743 B2 | 7/2009 | Furman et al. | |
| 7,635,035 B1 | 12/2009 | Bertagnolli et al. | |
| 7,971,663 B1 | 7/2011 | Vail | |
| 8,074,748 B1 | 12/2011 | Miess et al. | |
| 2004/0238227 A1 | 12/2004 | Smith et al. | |
| 2005/0019114 A1 | 1/2005 | Sung | |
| 2005/0051366 A1 | 3/2005 | Frushour | |
| 2005/0133277 A1 | 6/2005 | Dixon | |
| 2005/0186104 A1 | 8/2005 | Kear et al. | |
| 2006/0162969 A1 | 7/2006 | Belnap et al. | |
| 2006/0191722 A1 | 8/2006 | Belnap et al. | |
| 2007/0056778 A1 | 3/2007 | Webb et al. | |
| 2007/0079994 A1 | 4/2007 | Middlemiss | |
| 2007/0144790 A1 | 6/2007 | Fang et al. | |
| 2007/0151769 A1 | 7/2007 | Slutz et al. | |
| 2007/0187153 A1 | 8/2007 | Bertagnolli | |
| 2007/0234646 A1 | 10/2007 | Can et al. | |
| 2008/0023230 A1 | 1/2008 | Cho | |
| 2008/0023231 A1 | 1/2008 | Vail | |
| 2008/0073126 A1 | 3/2008 | Shen et al. | |
| 2008/0073127 A1 | 3/2008 | Zhan et al. | |
| 2008/0115424 A1 | 5/2008 | Can et al. | |
| 2008/0127475 A1 | 6/2008 | Griffo | |
| 2008/0168717 A1 | 7/2008 | Can et al. | |
| 2008/0179104 A1 | 7/2008 | Zhang et al. | |
| 2008/0206576 A1 | 8/2008 | Qian et al. | |
| 2008/0209818 A1 | 9/2008 | Belnap et al. | |
| 2008/0210473 A1 | 9/2008 | Zhang et al. | |
| 2008/0282618 A1 | 11/2008 | Lockwood | |
| 2009/0071726 A1 | 3/2009 | Belnap et al. | |
| 2009/0095538 A1 | 4/2009 | Middlemiss | |
| 2009/0107291 A1 | 4/2009 | Levashov et al. | |
| 2009/0152015 A1 | 6/2009 | Sani et al. | |
| 2010/0213247 A1 | 8/2010 | Egan et al. | |
| 2010/0243335 A1 | 9/2010 | Dourfaye et al. | |
| 2010/0294571 A1 | 11/2010 | Belnap et al. | |
| 2011/0023375 A1 | 2/2011 | Sani et al. | |
| 2011/0023377 A1 | 2/2011 | DiGiovanni | |
| 2011/0031034 A1 | 2/2011 | DiGiovanni et al. | |
| 2011/0031037 A1 | 2/2011 | Bellin et al. | |
| 2011/0036643 A1 | 2/2011 | Belnap et al. | |
| 2011/0061942 A1 | 3/2011 | DiGiovanni | |
| 2011/0088954 A1 | 4/2011 | DiGiovanni et al. | |
| 2011/0214921 A1 | 9/2011 | Naidoo | |
| 2011/0252712 A1 | 10/2011 | Chakraborty et al. | |
| 2012/0037431 A1 | 2/2012 | DiGiovanni et al. | |
| 2012/0111642 A1 | 5/2012 | DiGiovanni | |
| 2013/0256039 A1 | 10/2013 | DiGiovanni et al. | |
| 2014/0013670 A1 | 1/2014 | DiGiovanni et al. | |

FOREIGN PATENT DOCUMENTS

| | | |
|---|---|---|
| WO | 2006032984 A2 | 3/2006 |
| WO | 2006032984 A3 | 3/2006 |
| WO | 2007035394 A2 | 3/2007 |
| WO | 2007088461 A1 | 8/2007 |
| WO | 2007110770 A2 | 10/2007 |
| WO | 2007144731 A2 | 12/2007 |
| WO | 2007144731 A3 | 12/2007 |
| WO | 2007144733 A2 | 12/2007 |
| WO | 2007149266 A1 | 12/2007 |
| WO | 2007148214 A3 | 5/2008 |
| WO | 2008053431 A1 | 5/2008 |
| WO | 2008094190 A2 | 8/2008 |
| WO | 2008096314 A2 | 8/2008 |
| WO | 2008114228 A1 | 9/2008 |
| WO | 2009132035 A1 | 10/2009 |

OTHER PUBLICATIONS

Athanassiou, E.K., et al., "Large-scale production of carbon-coated copper nanoparticles for sensor applications," Nanotechnology, vol. 17, pp. 1668-1673, 2006.

Banhart, F. et al., "Carbon onions as nanoscopic pressure cells for diamond formation," Nature, vol. 382, pp. 433-435, Aug. 1, 1996.

Berger, Michael, "A green synthesis technique for fabricating carbon-coated magnetic nanoparticles," 2 pages, posted Aug. 15, 2006, copyright 2006 Nanowerk LLC.

Beulens, J.J. et al., "Diamond, Graphite, and Amorphous Carbon Deposition," Le Vide, Les Couches Minces—Supplement No. 256, pp. 329-331, Mar.-Apr. 1991.

Dahl, J.E., et al., "Isolation and Structure of Higher Diamondoids, Nanometer-Sized Diamond Molecules," Science, vol. 299, pp. 96-99, Jan. 3, 2003.

Fangli, Yuan, et al., "Preparation of zinc oxide nano-particels coated with aluminum," Journal of Materials Science Letters, vol. 20, pp. 1549-1551, 2001.

Furman et al., Structural and Mechanical Behavior of Layered Zirconium Phosphonate as a Distributed Phase in Polycaprolactone, Journal of Applied Polymer Science, vol. 114, pp. 993-1001, Jun. 2009.

Ghiringhelli, L.M., et al., "Local Structure of Liquid Carbon Controls Diamond Nucleation," Physical Review Letters, vol. 99, No. 5, pp. 055702-1 through 055702-4, Aug. 3, 2007.

Giber, J., et al., "Critical Point Energies in hcp and fcc Cobalt from Appearance Potential Spectra," Appl. Phys. A., vol. 52, pp. 167-170, Nov. 1991.

International Preliminary Report on Patentability for International Application No. PCT/US2010/048343 dated Mar. 13, 2012.

International Search Report for International Application No. PCT/US2010/048343 mailed Apr. 28, 2011, 3 pages.

International Written Opinion for International Application No. PCT/US2010/048343 mailed Apr. 28, 2011, 3 pages.

Itoh, M., et al., "Amorphous carbon nitride film preparation by plasma-assisted pulsed laser deposition method," Appl. Phys. A, vol. 79, pp. 1575-1578, 2004.

Kidalov, S.V., et al., "Thermal conductivity of nanocomposites based on diamonds and nanodiamonds," Diamond & Related Materials, vol. 16, 2063-2066, Jul. 2007.

Li, Junjie, et al., "Field emission enhancement of amorphous carbon films by nitrogen-implantation," Carbon, vol. 42, pp. 2309-2314, Jun. 2004.

Li, Q.Y., et al., "Photocatalytic characterization of silicia coated titania nanoparticles with tunable coatings," Journal of Nanoparticle Research, vol. 7, pp. 295-299, Nov. 2005.

(56) References Cited

OTHER PUBLICATIONS

Liu, Huimin, et al., "Diamond Chemical Vapor Deposition, Nucleation and Early Growth Stages," Dept. of Chemical and Vioresource Engineering, Colorado Stae Univeristy, ISBN 0-8155-1380-1, Noyes Publications, 198 pages, 1995.

Liu, Huimin, et al., "Nucleation Kinetics of Diamond on Carbide-Forming Substrates during Chemical Vapor Deposition," J. Electrochem. Soc., vol. 143, No. 3, pp. 1104-1109, Mar. 1996.

Liu, Huimin, et al., "Studies on nucleation process in diamond CVD; an overview of recent developments," Diamond and Related Materials, vol. 4, pp. 1173-1188, Apr. 1995.

Majetich, S.A. et al., "Preparation and properties of carbon-coated magnetic nanocrystallites," Phys. Rev. B, vol. 48 , pp. 16845-16848, 1993.

Meilunas, R.J., et al., "Diamond Nucleation on Surfaces Using Carbon Clusters," Office Naval Research, Technical Report No. 12, Dept. of Materials Science and Engineering, Nothwestern Univeristy, prepared for publication in the Journal of Materials Research, 61 pages, May 1993.

Osipov, A.S., et al., "Rapid sintering of nano-diamond compacts," Diamond & Related Materials, 4 pages, Jan. 2009.

Qian, J., et al., "Graphitization of diamond powders of different sizes at high pressure-high temperature," Carbon, vol. 42, pp. 2691-2697, Jun. 2004.

Qian, J., et al., "Micron diamond composites with nanocrystalline silicon carbide bonding," J. Mater. Res., vol. 18, No. 5, pp. 11736-1178, May 2003.

Sadangi, Rajendra K., et al., "WC-Co-Diamond Nano-Composites," NanoStructured Materials, vol. 12, pp. 1031-1034, 1999.

Schmidt, S., et al., "Watching the Growth of Bulk Grains During Recrystallization of Deformed Metals," Science, vol. 305, pp. 229-232, Jul. 9, 2004.

Sumiya, Hitoshi, et al., "Synthesis of High-Purity Nano-Polycrystalline Diamond and Its Characterization," SEI Technical Review, No. 59, pp. 52-59, Jan. 2005.

Wang, Guangzu, et al., "Effect of Recrystallized Graphite on the Nucleation of Diamond in Film Growth Reactions," Science and Technology of New Diamond, pp. 257-259, 1990.

Wei, Xian-Wen, et al., "A solution phase fabrication of magnetic nanpoarticles encapsulated in carbon," Nanotechnology, vol. 17, pp. 4307-4311, Aug. 2006.

Welz, Sascha, et al., "Nucleation, growth, and graphitization of diamond nanocrystals during chlorination of carbides," Journal of Applied Physics, vol. 93, No. 7, pp. 4207-4214, Apr. 1, 2003.

Wheeler, N.S., "Microstructural Characterization of Cobalt-Tungsten Coated Graphite Fibers," J. Res. Natl. Inst. Stand. Technol., vol. 100, No. 6, pp. 641-659, Nov.-Dec. 1995.

Wu, B.Y.C., et al., "Nanostructured Ni-Co Alloys with Tailarble Grain Size and Twin Density," Metallurgical and Materials Transactions A, vol. 36A, pp. 1927-1936, Jul. 2005.

Yanchuk, I.B., et al., "Raman scattering, AFM and nanoindentation characterization of diamond films obtained by hot filament CVD," Diamond and Related Materials, vol. 12, pp. 266-269, 2004.

Yushin, G.N., et al., "Effect of sintering on structure of nanodiamond," Diamond and Related Materials, vol. 14, pp. 1721-1729, 2005.

Zhang, L., et al., "Ultrafine and nanoscaled tungsten carbide synthesis from colloidal carbon coated nano tungsten precursor," Powder Metallurgy, vol. 49, No. 4, pp. 369-373, 2006.

Zhao, Y., et al., "Superhard B-C-N. materials synthesized in nanostructured bulks," J. Mater. Res., vol. 17, No. 12, pp. 3139-3145, Dec. 2002.

METHODS OF FORMING POLYCRYSTALLINE COMPACTS HAVING MATERIAL DISPOSED IN INTERSTITIAL SPACES THEREIN, CUTTING ELEMENTS AND EARTH-BORING TOOLS INCLUDING SUCH COMPACTS

CROSS-REFERENCE TO RELATED APPLICATION

This application is a divisional of U.S. patent application Ser. No. 12/558,184, filed Sep. 11, 2009, now U.S. Pat. No. 8,727,042, issued May 20, 2014, the disclosure of which is hereby incorporated herein by this reference in its entirety. This application is related to U.S. patent application Ser. No. 12/852,313, filed Aug. 6, 2012, now U.S. Pat. No. 8,579,052, issued Nov. 12, 2013, which claims the benefit of U.S. Provisional Patent Application Ser. No. 61/232,265, filed Aug. 7, 2009; and this application is also related to U.S. patent application Ser. No. 12/901,253, filed Oct. 8, 2010, now U.S. Pat. No. 8,496,076, issued Jul. 30, 2013, which claims the benefit of U.S. Provisional Patent Application Ser. No. 61/252,049, filed Oct. 15, 2009; and this application is also related to U.S. patent application Ser. No. 13/226,127, filed Sep. 6, 2011, now U.S. Pat. No. 8,800,693, issued Aug. 12, 2014, which claims the benefit of U.S. Provisional Patent Application Ser. No. 61/411,355, filed Nov. 8, 2010. This application is also related to U.S. patent application Ser. No. 14/030,820, filed Sep. 18, 2013, and U.S. patent application Ser. No. 14/257,825, filed Apr. 21, 2014, and U.S. patent application Ser. No. 13/904,590, filed May 29, 2013.

FIELD

The present invention relates generally to polycrystalline compacts, which may be used, for example, as cutting elements for earth-boring tools, and to methods of forming such polycrystalline compacts, cutting elements, and earth-boring tools.

BACKGROUND

Earth-boring tools for farming wellbores in subterranean earth formations generally include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "PDC"), which act as cutting faces of a polycrystalline diamond material. Polycrystalline diamond material is material that includes interbonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are typically formed by sintering and bonding together relatively small diamond grains under conditions of high temperature and high pressure in the presence of a catalyst (e.g., cobalt, iron, nickel, or alloys and mixtures thereof) to form a layer (e.g., a compact or "table") of polycrystalline diamond material on a cutting element substrate. These processes are often referred to as high temperature/high pressure (HTHP) processes. The cutting element substrate may comprise a cermet material (i.e., a ceramic-metal composite material) such as, for example, cobalt-cemented tungsten carbide. In such instances, the cobalt (or other catalyst material) in the cutting element substrate may be swept into the diamond grains during sintering and serve as the catalyst material for forming the inter-granular diamond-to-diamond bonds, and the resulting diamond table, from the diamond grains. In other methods, powdered catalyst material may be mixed with the diamond grains prior to sintering the grains together in a HTHP process.

Upon formation of a diamond table using a HTHP process, catalyst material may remain in interstitial spaces between the grains of diamond in the resulting polycrystalline diamond compact. The presence of the catalyst material in the diamond table may contribute to thermal damage in the diamond table when the cutting element is heated during use, due to friction at the contact point between the cutting element and the formation.

Polycrystalline diamond compact cutting elements in which the catalyst material remains in the polycrystalline diamond compact are generally thermally stable up to a temperature of about seven hundred fifty degrees Celsius (750° C.), although internal stress within the cutting element may begin to develop at temperatures exceeding about three hundred fifty degrees Celsius (350° C.). This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about seven hundred fifty degrees Celsius (750° C.) and above, stresses within the diamond table itself may increase significantly due to differences in the coefficients of thermal expansion of the diamond material and the catalyst material within the diamond table. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about seven hundred fifty degrees Celsius (750° C.), some of the diamond crystals within the polycrystalline diamond compact may react with the catalyst material causing the diamond crystals to undergo a chemical breakdown or back-conversion to another allotrope of carbon or another carbon-based material. For example, the diamond crystals may graphitize at the diamond crystal boundaries, which may substantially weaken the diamond table. In addition, at extremely high temperatures, in addition to graphite, some of the diamond crystals may be converted to carbon monoxide and carbon dioxide.

In order to reduce the problems associated with differential rates of thermal expansion and chemical breakdown of the diamond crystals in polycrystalline diamond compact cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the interbonded diamond crystals in the diamond table using, for example, an acid or combination of acids (e.g., aqua regia). All of the catalyst material may be removed from the diamond table, or catalyst material may be removed from only a portion thereof. Thermally stable polycrystalline diamond compacts in which substantially all catalyst material has been leached out from the diamond table have been reported to be thermally stable up to temperatures of about twelve hundred degrees Celsius (1200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having polycrystalline diamond compacts that are more thermally stable relative to non-leached polycrystalline diamond compacts, but that are also relatively less brittle and vulnerable to shear, compressive, and tensile stresses relative to fully leached diamond tables, cutting elements have been provided that include a diamond table in which the catalyst material has been leached from a portion or portions of the diamond table. For example, it is known to leach catalyst material from the cutting face, from the side of the diamond table, or both, to a desired depth within the diamond table, but without leaching all of the catalyst material out from the diamond table.

BRIEF SUMMARY

In some embodiments, the present invention includes polycrystalline compacts that comprise a plurality of grains of hard material having an average grain size of about five hundred nanometers (500 nm) or less. The plurality of grains of hard material are interspersed and interbonded to form a polycrystalline hard material. The polycrystalline hard material has an interstitial material disposed in at least some interstitial spaces between the plurality of grains of hard material. The interstitial material comprises at least one of a boride, a carbide, a nitride, a metal carbonate, a metal bicarbonate, and a non-catalytic metal.

In additional embodiments, the present invention includes polycrystalline compacts comprising a first plurality of grains of hard material having a first average grain size and at least a second plurality of grains of hard material having a second average grains size. The second average grain size of the at least a second plurality of grains is at least about one hundred fifty (150) times larger than the first average grain size of the first plurality of grains. The first plurality of grains and the at least a second plurality of grains are interspersed and interbonded to form a polycrystalline hard material. The polycrystalline hard material may further include an interstitial material disposed in at least some interstitial spaces between the first plurality of grains and the at least a second plurality of grains of the polycrystalline hard material. The interstitial material comprises at least one of a boride, a carbide, a nitride, a metal carbonate, a metal bicarbonate, and a non-catalytic metal.

Further embodiments of the present invention include cutting elements comprising a polycrystalline compact on a substrate. The polycrystalline compact comprises a plurality of interspersed and interbonded grains of hard material that form a polycrystalline hard material. The interbonded grains comprise a first plurality of grains having a first average grain size and at least a second plurality of grains having a second average grain size at least one hundred fifty (150) times larger than the first average grain size of the first plurality of grains. The polycrystalline compact may further include an interstitial material disposed in at least some interstitial spaces between the interbonded grains of the polycrystalline hard material. The interstitial material comprises at least one of a boride, a carbide, a nitride, a metal carbonate, a metal bicarbonate, and a non-catalytic metal.

Additional embodiments of the present invention include earth-boring drill bits that have a bit body and a plurality of cutting elements attached to the bit body. At least one cutting element of the plurality comprises a hard polycrystalline material that includes a first plurality of grains having a first average particle size, and at least a second plurality of grains having a second average particle size at least one hundred fifty (150) times larger than the first average particle size of the first plurality of grains. The first plurality of grains and the second plurality of grains are interspersed and interbonded to form the polycrystalline hard material. An interstitial material may be disposed in at least some interstitial spaces between the interspersed and interbonded grains of the polycrystalline hard material. The interstitial material comprises at least one of a boride, a carbide, a nitride, a metal carbonate, a metal bicarbonate, and a non-catalytic metal.

Additional embodiments of the present invention include methods of making a polycrystalline compact. The methods include at least partially coating each nanoparticle of a plurality of nanoparticles of hard material with a coating material comprising at least one of a boride, a carbide, a nitride, a metal carbonate, a metal bicarbonate, and a non-catalytic metal. The nanoparticles are sintered to form a polycrystalline hard material comprising a plurality of grains form from the plurality of nanoparticles. The plurality of grains are interspersed and interbonded to form the polycrystalline hard material Still further embodiments of the present invention include methods of making a polycrystalline compact. The methods include at least partially coating each particle of a first plurality of particles having a first average particle size with a coating material comprising at least one of a boride, a carbide, a nitride, a metal carbonate, a metal bicarbonate, and a non-catalytic metal. The coated first plurality of particles are dispersed among at least a second plurality of particles having a second average particle size that is larger than the first average particle size of the first plurality of particles, and the first plurality of particles and the at least a second plurality of particles are sintered to form a polycrystalline hard material that includes a first plurality of grains formed from the first plurality of particles and a second plurality of grains formed from the second plurality of particles. The first plurality of grains and the second plurality of grains are interspersed and interbonded to form the polycrystalline hard material. The first average particle size of the first plurality of particles and the second average particle size of the second plurality of particles may be selected to cause the second plurality of grains to have a second average grain size at least about one hundred fifty (150) times larger than a first average grain size of the first plurality of grains.

BRIEF DESCRIPTION OF THE DRAWINGS

While the specification concludes with claims particularly pointing out and distinctly claiming what are regarded as embodiments of the present invention, various features and advantages of embodiments of the invention may be more readily ascertained from the following description of some embodiments of the invention when read in conjunction with the accompanying drawings, in which:

DETAILED DESCRIPTION

Figure 1A:
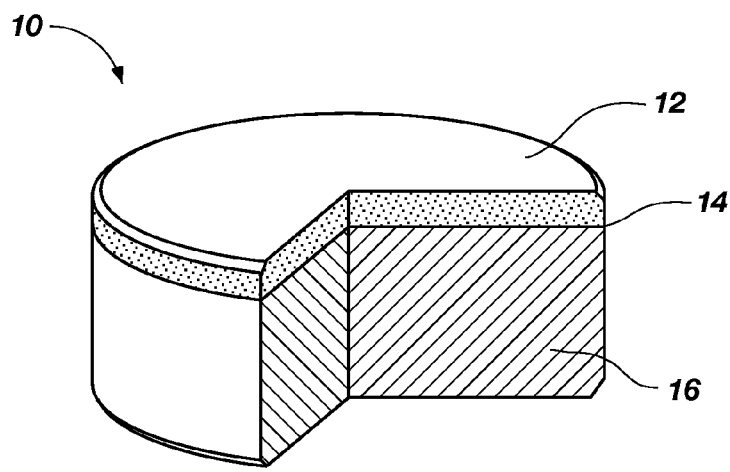
FIG. 1A is a partial cut-away perspective view illustrating an embodiment of a cutting element comprising a polycrystalline compact of the present invention.

The illustrations presented herein are not actual views of any particular polycrystalline compact, microstructure of a polycrystalline compact, particle, cutting element, or drill bit, and are not drawn to scale, but are merely idealized representations employed to describe the present invention. Additionally, elements common between figures may retain the same numerical designation.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, mills, drag bits, roller cone bits, hybrid bits and other drilling bits and tools known in the art.

As used herein, the term "fullerene" means and includes cage-like hollow molecules comprising a plurality of carbon atoms bonded together in a polyhedral structure. Fullerenes may include, for example, between about twenty (20) and about one hundred (100) carbon atoms. For example, $C_{60}$ is a fullerene having sixty (60) carbon atoms, and is a relatively common, commercially available fullerene. Other fullerenes include, for example, $C_{30}$, $C_{32}$, $C_{34}$, $C_{38}$, $C4_{40}$, $C_{42}$, $C_{44}$, $C_{46}$, $C_{48}$, $C_{50}$, $C_{52}$, and $C_{70}$.

As used herein, the term "nanoparticle" means and includes any particle having an average particle diameter of about 500 nm or less.

As used herein, the term "carbon compound" means and includes any material comprising two or more chemical elements, one of which is carbon, that together form a generally crystalline substance having a defined chemical composition. Carbon compounds do not include pure allotropes (e.g., diamond, graphite, amorphous carbon, buckminsterfullerenes, etc.), which comprise only the element of carbon. Carbides are carbon compounds.

As used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material or materials used to form the polycrystalline material.

As used herein, the term "inter-granular bond" means and includes any direct atomic bond (e.g., covalent, metallic, etc.) between atoms in adjacent grains of material.

As used herein, the term "diamondoid" means and includes the carbon cage molecule known as adamantane ($C_{10}H_{16}$), which is the smallest unit cage structure of the diamond crystal lattice, as well as variants of adamantane (e.g., molecules in which other atoms (e.g., N, O, Si, or S) are substituted for carbon atoms in the molecule) and carbon cage polymantane molecules including between two (2) and about twenty (20) adamantane cages per molecule (e.g., diamantane, triamantane, tetramantane, pentamantane, hexamantane, heptamantane, etc.).

As used herein, the term "catalyst material" refers to any material that is capable of substantially catalyzing the formation of inter-granular bonds between grains of hard material during an HTHP process. For example, catalyst materials for diamond include cobalt, iron, nickel, other elements from Group VIIIA of the Periodic Table of the Elements, and alloys thereof.

As used herein, the term "non-catalytic metal" refers to any metal or metal alloy that is not a catalyst material.

As used herein, the term "hard material" means and includes any material having a Knoop hardness value of about 3,000 $Kg/mm^2$ (29,420 MPa) or more. Hard materials include, for example, diamond and cubic boron nitride.

FIG. 1A is a simplified, partially cut-away perspective view of an embodiment of a cutting element 10 of the present invention. The cutting element 10 comprises a polycrystalline compact in the form of a layer of hard polycrystalline material 12, also known in the art as a polycrystalline table, that is provided on (e.g., formed on or attached to) a supporting substrate 16 with an interface 14 therebetween. Though the cutting element 10 in the embodiment depicted in FIG. 1A is cylindrical or disc-shaped, in other embodiments, the cutting element 10 may have any desirable shape, such as a dome, cone, chisel, etc.

In some embodiments, the polycrystalline material 12 comprises polycrystalline diamond. In such embodiments, the cutting element 10 may be referred to as a polycrystalline diamond compact (PDC) cutting element. In other embodiments, the polycrystalline material 12 may comprise another hard material such as, for example, polycrystalline cubic boron nitride.

Figure 1B:
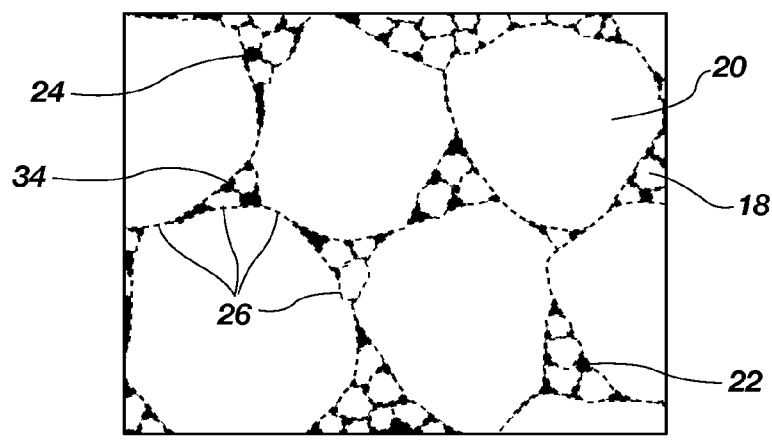
FIG. 1B is a simplified drawing showing how a microstructure of the polycrystalline compact of FIG. 1A may appear under magnification, and illustrates interbonded and interspersed larger and smaller grains of hard material.

FIG. 1B is an enlarged view illustrating how a microstructure of the polycrystalline material 12 of the cutting element 10 may appear under magnification. As discussed in further detail below, the polycrystalline material 12 includes at least some grains of hard material that have an average grain size of about five hundred nanometers (500 nm) or less (e.g., between about one nanometer (1 nm) and about one hundred fifty nanometers (150)). Thus, at least some grains of hard material in the microstructure of the polycrystalline material 12 may be nanoparticles.

As shown in FIG. 1B, the grains of the polycrystalline material 12 may have a multi-modal (e.g., bi-modal, tri-modal, etc.) grain size distribution. In other words, the layer of hard polycrystalline material 12 includes a first plurality of grains 18 of hard material having a first average grain size, and at least a second plurality of grains 20 of hard material having a second average grain size that differs from the first average grain size of the first plurality of grains 18.

For example, the second plurality of grains 20 may be larger than the first plurality of grains 18. For example, the average grain size of the larger grains 20 may be at least about one hundred fifty (150) times greater than the average grain size of the smaller grains 18. In additional embodiments, the average grain size of the larger grains 20 may be at least about five hundred (500) times greater than the average grain size of the smaller grains 18. In yet further embodiments, the average grain size of the larger grains 20 may be at least about seven hundred fifty (750) times greater than the average grain size of the smaller grains 18. The smaller grains 18 and the larger grains 20 may be interspersed and interbonded to form the layer of hard polycrystalline material 12. In other words, in embodiments in which the polycrystalline material 12 comprises polycrystalline diamond, the smaller grains 18 and the larger grains 20 may be mixed together and bonded directly to one another by inter-granular diamond-to-diamond bonds 26 (represented by dashed lines in FIG. 1B).

As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface of a polycrystalline material 12 (e.g., a polished and etched surface of the polycrystalline material 12). Commercially available vision systems are often used with such microscopy systems, and these vision systems are capable of measuring the average grain size of grains within a microstructure.

By way of example and not limitation, in embodiments in which the average grain size of the smaller grains 18 is between about one nanometer (1 nm) and about one hundred fifty nanometers (150 nm), the average grain size of the larger grains 20 may be between about five microns (5 μm) and about forty microns (40 μm). Thus, in some embodiments, the ratio of the average grain size of the larger grains 20 to the average grain size of the smaller grains 18 may be between about 33:1 and about 40,000:1.

The large difference in the average grain size between the smaller grains 18 and the larger grains 20 may result in smaller interstitial spaces 22 or voids (represented as shaded areas in FIG. 1B) within the microstructure of the polycrystalline material 12 (relative to conventional polycrystalline materials), and the total volume of the interstitial spaces 22 or voids may be more evenly distributed throughout the microstructure of the polycrystalline material 12. As a result, any material present within the interstitial spaces 22 (e.g., a carbon compound or a catalyst material, as described below) may also be more evenly distributed throughout the microstructure of the polycrystalline material 12 within the relatively smaller interstitial spaces 22 therein.

In some embodiments, the number of smaller grains 18 per unit volume of the polycrystalline material 12 may be higher than the number of larger grains 20 per unit volume of the polycrystalline material 12.

The smaller grains 18 may comprise between about one-half of one percent (0.5%) and about thirty percent (30%) by volume of the polycrystalline material 12. More specifically, the smaller grains 18 may comprise between about one-half of one percent (0.5%) and about ten percent (10%) by volume of the polycrystalline material 12, or even between about one-half of one percent (0.5%) and about five percent (5%) by volume of the polycrystalline material 12. The remainder of the volume of the polycrystalline material 12 may be substantially comprised by the larger grains 20. A relatively small percentage of the remainder of the volume of the polycrystalline material 12 (e.g., less than about ten percent (10%)) may comprise interstitial spaces 22 between the smaller grains 18 and the larger grains 20, which spaces may be at least partially filled with a interstitial material 34 and a catalyst material 24, as described below.

The interstitial spaces 22 interspersed throughout the microstructure of the polycrystalline material 12 between the smaller grains 18 and the larger grains 20 may have an interstitial material 34 disposed therein that originates from a coating (not shown in FIG. 1B) disposed on the smaller grains 18 prior to fabrication of the polycrystalline material 12. The coating material that is originally present on the smaller grains 18 may ultimately reside in the interstitial spaces 22 after fabrication of the polycrystalline material 12. The interstitial material 34 may comprise at least one of a boride, a carbide, a nitride, a metal carbonate (e.g., calcium carbonate, magnesium carbonate, strontium carbonate, barium carbonate, etc.), a metal bicarbonate, and a non-catalytic metal. For example, the interstitial material 34 may comprise a metal carbide such as silicon carbide, titanium carbide, tungsten carbide, tantalum carbide, etc., in some embodiments. In additional embodiments, the interstitial material 34 may comprise a carbon nitride material or a carbon boride material.

In some embodiments, the polycrystalline material 12 may also include a catalyst material 24 disposed in interstitial spaces 22 between the smaller grains 18 and the larger grains 20 of the polycrystalline hard material. The catalyst material 24 may comprise a catalyst material 24 capable of (and used to) catalyze the formation of the inter-granular bonds 26 between the grains of the smaller grains 18 and the larger grains 20 of the polycrystalline material 12. In other embodiments, however, the interstitial spaces 22 between the smaller grains 18 and the larger grains 20 in some or all regions of the polycrystalline material 12 may be at least substantially free of such a catalyst material 24. In such embodiments, the interstitial spaces 22 may comprise voids filled with gas (e.g., air), in addition to any interstitial material 34 present therein.

In embodiments in which the polycrystalline material 12 comprises polycrystalline diamond, the catalyst material 24 may comprise a Group VIIIA element (e.g., iron, cobalt, or nickel) or an alloy thereof, and the catalyst material 24 may comprise between about one half of one percent (0.1%) and about ten percent (10%) by volume of the hard polycrystalline material 12. In additional embodiments, the catalyst material 24 may comprise a carbonate material such as, for example, a carbonate of one or more of magnesium, calcium, strontium, and barium. Carbonates may also be used to catalyze the formation of polycrystalline diamond. Accordingly, the interstitial material 34 may also act as a catalyst material 24 in some embodiments of the invention.

The layer of hard polycrystalline material 12 of the cutting element 10 may be formed using a high temperature/high pressure (HTHP) process. Such processes, and systems for carrying out such processes, are generally known in the art. In some embodiments, the polycrystalline material 12 may be formed on a supporting substrate 16 (as shown in FIG. 1A) of cemented tungsten carbide or another suitable substrate material in a conventional HTHP process of the type described, by way of non-limiting example, in U.S. Pat. No. 3,745,623 to Wentorf et al. (issued Jul. 17, 1973), or may be formed as a freestanding polycrystalline material 12 (i.e., without the supporting substrate 16) in a similar conventional HTHP process as described, by way of non-limiting example, in U.S. Pat. No. 5,127,923 Bunting et al. (issued Jul. 7, 1992), the disclosure of each of which patents is incorporated herein in its entirety by this reference. In some embodiments, the catalyst material 24 may be supplied from the supporting substrate 16 during an HTHP process used to form the polycrystalline material 12. For example, the substrate 16 may comprise a cobalt-cemented tungsten carbide material. The cobalt of the cobalt-cemented tungsten carbide may serve as the catalyst material 24 during the HTHP process.

To form the polycrystalline material 12 in an HTHP process, a particulate mixture comprising larger particles of hard material, as well as coated, smaller nanoparticles of hard material (as described in detail below) may be subjected to elevated temperatures (e.g., temperatures greater than about one thousand degrees Celsius (1,000° C.)) and elevated pressures (e.g., pressures greater than about five gigapascals (5.0 GPa)) to form inter-granular bonds 26 between the particles, thereby forming the larger grains 20 and the smaller grains 18 of the polycrystalline material 12 from the larger and smaller particles, respectively. In some embodiments, the particulate mixture may be subjected to a pressure greater than about six gigapascals (6.0 GPa) and a temperature greater than about one thousand five hundred degrees Celsius (1,500° C.) in the HTHP process.

The time at the elevated temperatures and pressures may be relatively short when compared to conventional HTHP processes to prevent the atoms of the smaller grains 18 from diffusing to, and being incorporated into, the larger grains 20. For example, in some embodiments, the particulate mixture may be subjected to a pressure greater than about six gigapascals (6.0 GPa) and a temperature greater than about one thousand five hundred degrees Celsius (1,500° C.) for less than about two minutes (2.0 min) during the HTHP process.

In embodiments in which a carbonate catalyst material 24 (e.g., a carbonate of one or more of magnesium, calcium, strontium, and barium) is used to catalyze the formation of polycrystalline diamond, the particulate mixture may be subjected to a pressure greater than about seven point seven gigapascals (7.7 GPa) and a temperature greater than about two thousand degrees Celsius (2,000° C.).

The particulate mixture may comprise particles for forming the larger grains 20 previously described herein. The particulate mixture may also comprise particles of catalyst material 24. In some embodiments, the particulate mixture may comprise a powder-like substance. In other embodiments, however, the particulate mixture may be carried by (e.g., on or in) another material, such as a paper or film, which may be subjected to the HTHP process.

Figure 2:
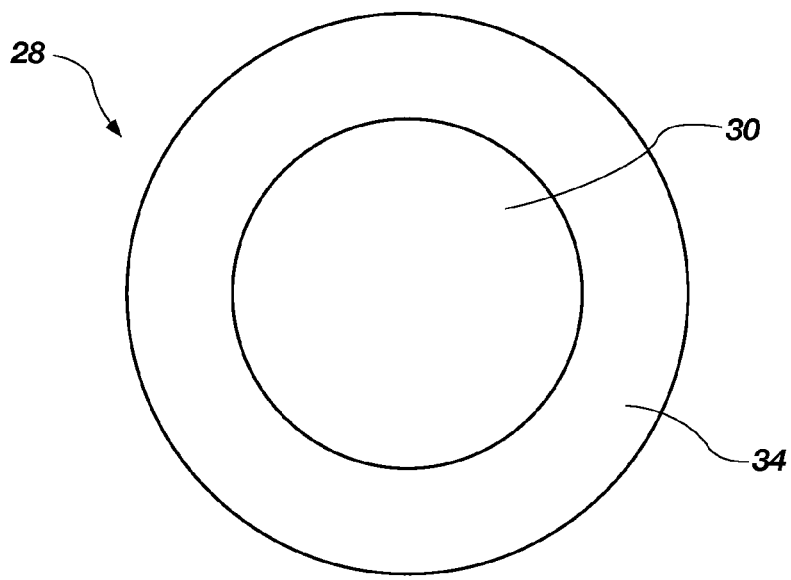
FIG. 2 is a simplified drawing of a coated nanoparticle that may be used to form a polycrystalline compact like that of FIGS. 1A and 1B in accordance with some embodiments of methods of the present invention.

The particulate mixture may also comprise smaller particles (e.g., nanoparticles) for forming the smaller grains 18 previously described herein, which may be provided as coated nanoparticles 28 like that shown in the simplified illustration of FIG. 2. The coated nanoparticles 28 may comprise nanoparticles 30 of a hard material that are at least partially coated with a coating material 37 prior to being subjected to the HTHP process. In embodiments in which the polycrystalline material 12 includes polycrystalline diamond, the nanoparticles 30 may comprise, for example, diamond or diamondoid nanocrystals.

As previously mentioned, the coating material 37 corresponds to, and may ultimately form, the interstitial material 34 previously described with reference to FIG. 1B. Thus, the coating material 37 may comprise at least one of a boride, a carbide, a nitride, a metal carbonate (e.g., calcium carbonate, magnesium carbonate, strontium carbonate, barium carbonate, etc.), a metal bicarbonate, and a non-catalytic metal. For example, the coating material 37 may comprise a metal carbide such as silicon carbide, titanium carbide, tungsten carbide, tantalum carbide, etc., in some embodiments. In additional embodiments, the coating material 37 may comprise a carbon nitride material or a carbon boride material. Nitrogen and boron are elements known to diffuse readily in certain hard materials, such as diamond. Thus in some embodiments, elements of the coating material 37 may migrate to, and diffuse within, the smaller grains 18, the larger grains 20, or to both the smaller grains 18 and the larger grains 20 during an HTHP process used to form the polycrystalline material 12, without adversely affecting the physical properties of the polycrystalline material 12 in any significant manner.

By way of example and not limitation, processes such as liquid sol-gel, flame spray pyrolysis, chemical vapor deposition (CVD), physical vapor deposition (PVD) (e.g., sputtering), and atomic layer deposition (ALD), may be used to provide the coating material 37 on the nanoparticles 30. Other techniques that may be used to provide the coating material 37 on the nanoparticles 30 include colloidal coating processes, plasma coating processes, microwave plasma coating processes, physical admixture processes, van der Waals coating processes, and electrophoretic coating processes. In some embodiments, coating material 37 may be provided on the nanoparticles 30 in a fluidized bed reactor.

As known in the art, nanoparticles 30 of diamond or diamondoid crystals typically comprise a relatively thin carbon-based, non-diamond outer layer or shell. Such a shell may comprise, for example, amorphous carbon, and is often referred to in the art as a "carbon onion." In accordance with some embodiments of the present invention, such a carbon-based, non-diamond outer layer or shell on the nanoparticles 30 may be at least partially replaced with a coating material 37 by, for example, reacting the carbon of the carbon-based, non-diamond outer layer or shell with one or more additional elements to form the coating material 37, or by removing the non-diamond outer layer or shell on the nanoparticles 30 and subsequently depositing the coating material 37 over the nanoparticles 30.

In some embodiments, coated nanoparticles 28 like that shown in FIG. 2 may be formed by nitriding (reacting nitrogen with) or boriding (reacting boron with) the relatively thin carbon-based, non-diamond outer layer or shell of nanoparticles 30 of diamond or diamondoid crystals to form a carbon nitride or a carbon boride coating material 37.

In further embodiments, coated nanoparticles 28 like that shown in FIG. 2 may be formed by depositing a non-catalytic metal over nanoparticles 30 of diamond or diamondoid crystals to form a non-catalytic metal coating material 37.

In additional embodiments, coated nanoparticles 28 like that shown in FIG. 2 may be formed by at least partially coating the nanoparticles 30 with a reagent material capable of reacting with carbon to form the coating material 37, and reacting the reagent material with carbon atoms in or on each of the nanoparticles 30 to form the coating material 37, as described below with reference to FIG. 3.

Figure 3:
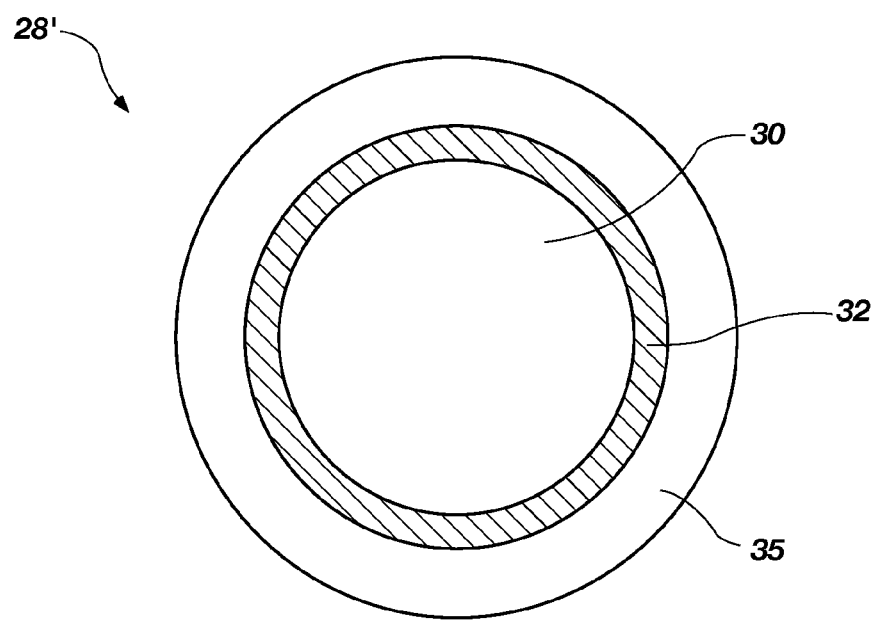
FIG. 3 is a simplified drawing of another coated nanoparticle that may be used to form a polycrystalline compact like that of FIGS. 1A and 1B in accordance with some embodiments of methods of the present invention.

FIG. 3 illustrates a multi-layer coated nanoparticle 28' that includes a diamond nanoparticle 30, a non-diamond carbon shell 32 at least partially coating the diamond nanoparticle 30, and a layer of reagent material 35 at least partially coating the carbon shell 32. Thus, although the carbon shell 32 and the reagent material 35 are depicted in FIG. 3 as completely encapsulating the nanoparticle 30, in other embodiments, they may only partially coat the nanoparticle 30. The diamond nanoparticle 30 may comprise a single diamond crystal or a cluster of diamond crystals.

As previously mentioned, the reagent material 35 comprises a material capable of reacting with carbon atoms of the carbon shell 32 to form the coating material 37 (FIG. 2). By way of example and not limitation, the reagent material 35 may comprise, for example, at least one of nitrogen, a nitrogen compound, a carbonate-forming metal, a metal carbonate, a bicarbonate-forming metal, a metal bicarbonate, a carbide-forming metal, and a metal carbide.

The carbon shell 32 may react with the reagent material 35 to form the coating material 37. In some embodiments, at least a portion of the non-diamond carbon shell 32 may undergo a change in atomic structure during or prior to sintering. Carbon atoms in the non-diamond carbon shell 32 may diffuse to and enter the diamond crystal structure of the diamond nanoparticle 30 (i.e., contribute to grain growth of the diamond nanoparticle 30). Some atoms of the non-diamond carbon shell 32 may also be incorporated into the larger grains 20, or may nucleate and form additional, new smaller grains 18.

The coated nanoparticles 28 and the diamond nanoparticles 30 may have an average particle size selected to cause the average grain size of the smaller grains 18 (formed from the diamond nanoparticles 30) to be between about one nanometer (1 nm) and about one hundred fifty nanometers (150 nm). Furthermore, as previously mentioned, the particulate mixture used to form the polycrystalline material 12 may further comprise particles for forming the larger grains 20. The average particle size of these relatively larger particles may be selected to cause the average grain size of the larger grains 20 (formed from the relatively larger particles) to be between about five microns (5 µm) and about forty microns (40 µm). The average thickness of the carbon shell 32 and the resulting coating material 37 layer may be selected dependent upon the particular material compositions of these layers, as well as on the desired final composition and microstructure of the polycrystalline material 12.

Multi-layer coated nanoparticles 28' like that shown in FIG. 3 may be formed by providing (e.g., depositing, growing, forming, etc.) reagent material 35 on the nanoparticles 30, which may have a naturally occurring non-diamond carbon shell 32 thereon. The process used to provide the reagent material 35 on the nanoparticles 30 will depend upon the particular composition of the reagent material 35 to be provided on the nanoparticles 30. By way of example and not limitation, processes such as liquid sol-gel, flame spray pyrolysis, chemical vapor deposition (CVD), physical vapor deposition (PVD) (e.g., sputtering), and atomic layer deposition (ALD), may be used to provide the reagent material 35 on the nanoparticles 30. Other techniques that may be used to provide the reagent material 35 on the nanoparticles 30 include colloidal coating processes, plasma coating processes, microwave plasma coating processes, physical admixture processes, van der Waals coating processes, and electrophoretic coating processes. In some embodiments, the non-diamond carbon shell 32 and the reagent material 35 may be provided on the nanoparticles 30 in a fluidized bed reactor.

If the nanoparticle 30 does not have a naturally occurring non-diamond carbon shell 32 thereon, the non-diamond carbon shell 32 may be formed on the nanoparticle 30 by, for example, heating the nanoparticle 30 to an elevated temperature and causing an outer region of the diamond nanoparticle 30 to decompose from diamond to a carbon-based, non-diamond material such as amorphous carbon.

In some embodiments, the reagent material 35 may react with the non-diamond carbon shell 32 to form the coating material 37 as the reagent material 35 is deposited on the carbon shell 32 without any need for further processing to initiate the reaction therebetween. In such embodiments, multi-layer coated nanoparticles 28' like that of FIG. 3 may be transient in nature, such that they are not formed or stable for any significant period of time, and coated nanoparticles 28 like that shown in FIG. 2 may simply form as the reagent material 35 is deposited over the non-diamond carbon shell 32. In other embodiments, however, the reagent material 35 may not react with the non-diamond carbon shell 32 to form the coating material 37 without further processing. In other words, multi-layer coated nanoparticles 28' like that of FIG. 3 may form upon deposition of the reagent material 35, and the multi-layer coated nanoparticles 28' may subsequently be subjected to one or more of a selected temperature, pressure, and atmosphere to cause the reagent material 35 and the non-diamond carbon shell 32 to react with one another to form the coating material 37. Furthermore, in some embodiments, the reagent material 35 and the non-diamond carbon shell 32 may react with one another during an HTHP process used to form the polycrystalline material 12 from a particulate mixture including the multi-layer coated nanoparticles 28'.

In additional embodiments, the coated nanoparticle 28 of FIG. 2 may comprise a nanoparticle 30 and a coating material that is not reactive with the nanoparticle 30. For example, in embodiments in which the nanoparticle 30 comprises diamond and has an outer non-diamond carbon shell 32 (FIG. 3), the coating material may comprise a material that will not react with the nanoparticle 30 or the non-diamond carbon shell 32, but that will thermally stabilize the nanoparticle 30 during an HTHP process used to form a polycrystalline material 12, as discussed in further detail below.

As previously mentioned, a particulate mixture that includes relatively smaller particles (e.g., coated particles like the coated particle 28 of FIG. 2 or multi-layer coated particles 28' like that of FIG. 3) for forming the smaller grains 18, relatively larger particles for forming the larger grains 20, and, optionally, a catalyst material 24 (for catalyzing the formation of inter-granular bonds 26 between the smaller grains 18 and the larger grains 20) may be subjected to an HTHP process to form a polycrystalline material 12. After the HTHP process, catalyst material 24 (e.g., cobalt) may be disposed in at least some of the interstitial spaces 22 between the interbonded smaller grains 18 and larger grains 20. During the HTHP process, at least some of the coating material 37 on the smaller particles may be displaced or diffuse during the HTHP process to allow the formation of inter-granular bonds 26 between the nanoparticles 30 and the relatively larger particles of hard material. After the HTHP process, the coating material 37 may also be disposed in at least some of the interstitial spaces 22 between the smaller grains 18 and the larger grains 20 of the polycrystalline material 12, and, thus, may be characterized as the interstitial material 34 previously described herein with reference to FIG. 1B.

Optionally, the catalyst material 24, the interstitial material 34, or both the catalyst material 24 and the interstitial material 34 may be removed from the polycrystalline material 12 after the HTHP process, as is known in the art. For example, a leaching process may be used to remove the catalyst material 24 and/or the interstitial material 34 from the interstitial spaces 22 between the interbonded smaller grains 18 and larger grains 20 of the polycrystalline material 12. By way of example and not limitation, the polycrystalline material 12 may be leached using a leaching agent and process such as those described more fully in, for example, U.S. Pat. No. 5,127,923 to Bunting et al. (issued Jul. 7, 1992), and U.S. Pat. No. 4,224,380 to Bovenkerk et al. (issued Sep. 23, 1980), the disclosure of each of which patent is incorporated herein in its entirety by this reference. Specifically, aqua regia (a mixture of concentrated nitric acid ($HNO_3$) and concentrated hydrochloric acid (HCl)) may be used to at least substantially remove catalyst material 24 and/or interstitial material 34 from the interstitial spaces 22. It is also known to use boiling hydrochloric acid (HCl) and boiling hydrofluoric acid (HF) as leaching agents. One particularly suitable leaching agent is hydrochloric acid (HCl) at a temperature of above one hundred ten degrees Celsius (110° C.), which may be provided in contact with the polycrystalline material 12 for a period of about two (2) hours to about sixty (60) hours, depending upon the size of the body comprising the polycrystalline material 12. After leaching the polycrystalline material 12, the interstitial spaces 22 between the interbonded smaller grains 18 and larger grains 20 within the polycrystalline material 12 may be at least substantially free of catalyst material 24 used to catalyze formation of inter-granular bonds 26 between the grains in the polycrystalline material 12, and may be at least substantially free of interstitial material 34. Furthermore, only a portion of the polycrystalline material 12 may be subjected to the leaching process, or the entire body of the polycrystalline material 12 may be subjected to the leaching process.

Figure 4:
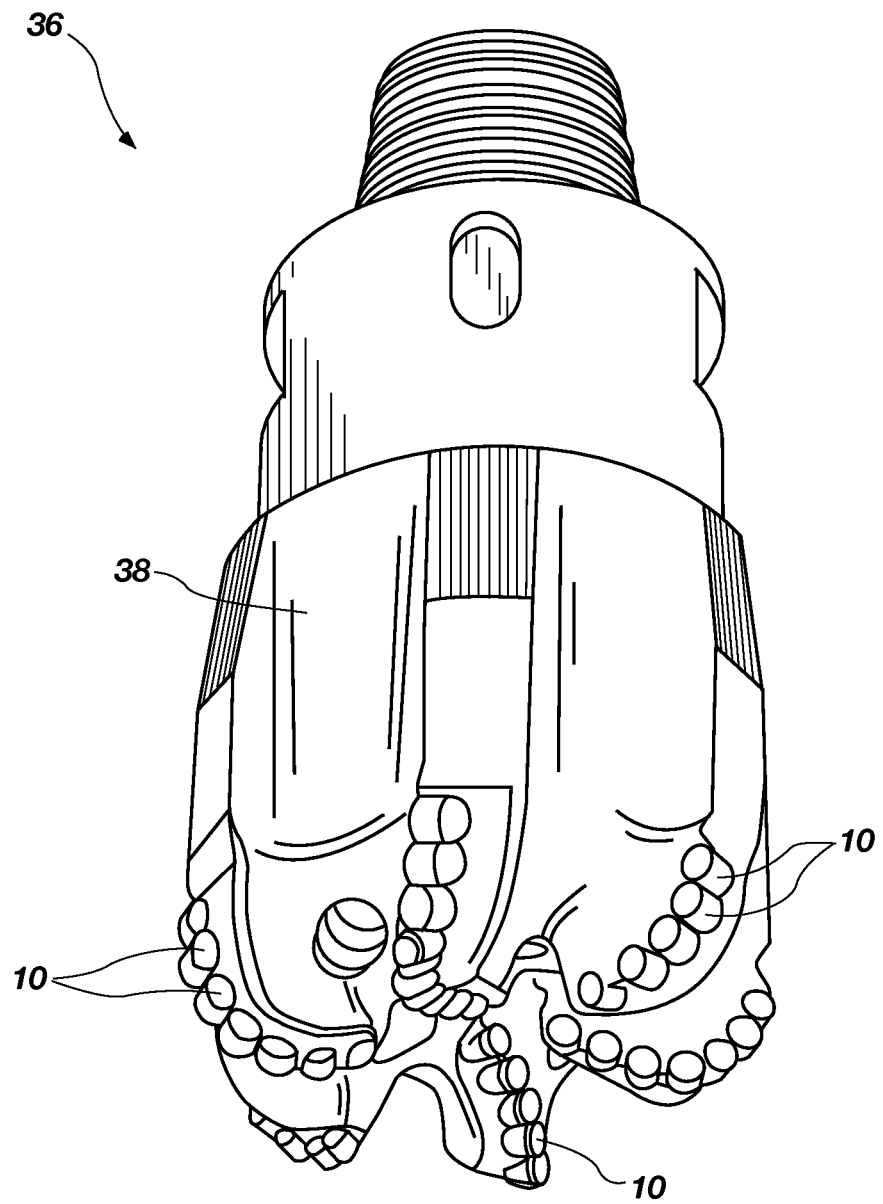
FIG. 4 is a perspective view of an embodiment of a fixed-cutter earth-boring rotary drill bit that includes a plurality of polycrystalline compacts like that shown in FIGS. 1A and 1B.

Embodiments of cutting elements 10 of the present invention that include a polycrystalline compact comprising polycrystalline material 12 formed as previously described herein, such as the cutting element 10 illustrated in FIG. 1A, may be formed and secured to an earth-boring tool such as, for example, a rotary drill bit, a percussion bit, a coring bit, an eccentric bit, a reamer tool, a milling tool, etc., for use in forming wellbores in subterranean formations. As a non-limiting example, FIG. 4 illustrates a fixed cutter type earth-boring rotary drill bit 36 that includes a plurality of cutting elements 10, each of which includes a polycrystalline compact comprising polycrystalline material 12 as previously described herein. The rotary drill bit 36 includes a bit body 38, and the cutting elements 10, which include polycrystalline compacts 12, are bonded to the bit body 38. The cutting elements 10 may be brazed (or otherwise secured) within pockets formed in the outer surface of the bit body 38.

Polycrystalline hard materials having a relatively large difference in average grain size between a first plurality of relatively smaller grains and a second plurality of relatively larger grains, as described hereinabove, may exhibit improved thermal stability, improved mechanical durability, or both improved thermal stability and improved mechanical durability relative to previously known polycrystalline hard materials. By surrounding the relatively larger grains with the relatively smaller grains, less catalyst material may be disposed in interstitial spaces between the grains in the ultimate polycrystalline hard material, which may improve one or both of the thermal stability and the mechanical durability of the polycrystalline hard material. Furthermore, as nanoparticles are relatively reactive compared to larger particles due, at least in part, to the high surface energy of the nanoparticles, nanoparticles of a hard material used to form the relatively smaller grains of hard material in the polycrystalline hard material may be coated, as described hereinabove, to improve the stability (e.g., thermal stability) of the nanoparticles during an HTHP process used to form the polycrystalline hard material.

The foregoing description is directed to particular embodiments for the purpose of illustration and explanation. It will be apparent, however, to one skilled in the art that many modifications and changes to the embodiments set forth above are possible without departing from the scope of the embodiments disclosed herein as hereinafter claimed, including legal equivalents. It is intended that the following claims be interpreted to embrace all such modifications and changes.

What is claimed is:

1. A method of forming a polycrystalline compact, comprising:
    preparing a plurality of nanoparticles of hard material for a sintering process, comprising:
        selecting a coating material comprising at least one of a boride, a carbide, a nitride, a metal carbonate, a metal bicarbonate, and a non-catalytic metal; and
        at least partially coating each nanoparticle of the plurality of nanoparticles with the coating material forming a plurality of coated nanoparticles of hard material prior to sintering the plurality of nanoparticles of hard material; and
    sintering the plurality of coated nanoparticles of hard material to form a polycrystalline hard material comprising a plurality of hard material grains formed from the plurality of nanoparticles, the plurality of hard material grains being interspersed and interbonded to form the polycrystalline hard material, the coating material forming an interstitial material disposed in at least some interstitial spaces between the plurality of hard material grains formed from the plurality of nanoparticles of hard material.

2. The method of claim 1, further comprising selecting each nanoparticle of the plurality of nanoparticles to comprise diamond.

3. The method of claim 2, further comprising selecting the coating material to comprise at least one of carbon nitride, carbon boride, a metal carbonate, a metal bicarbonate, and a metal carbide.

4. The method of claim 3, wherein at least partially coating each nanoparticle of the plurality of nanoparticles comprises:
    at least partially coating each nanoparticle of the plurality of nanoparticles with a reagent material capable of reacting with carbon to form the coating material; and
    reacting the reagent material with carbon atoms in or on each coated nanoparticle of the plurality of nanoparticles to form the coating material.

5. A method of forming a polycrystalline compact, comprising:
    preparing a first plurality of particles of hard material having a first average particle size and at least a second plurality of particles of hard material having a second average particle size larger than the first average particle size of the first plurality of particles of hard material for a subsequent sintering process, comprising:
        selecting a coating material for the first plurality of particles of hard material, the coating material comprising at least one of a boride, a carbide, a nitride, a metal carbonate, a metal bicarbonate, and a non-catalytic metal;
        at least partially coating each particle of the first plurality of particles of hard material with the coating material forming a first plurality of coated particles of hard material; and
        dispersing the first plurality of coated particles of hard material among the at least a second plurality of particles of hard material;
    sintering the first plurality of coated particles of hard material and the at least a second plurality of particles of hard material to form a polycrystalline hard material comprising a first plurality of hard material grains formed from the first plurality of coated particles of hard material and a second plurality of hard material grains formed from the at least a second plurality of particles of hard material, the first plurality of hard material grains and the second plurality of hard material grains being interspersed and interbonded to form the polycrystalline hard material, the coating material forming an interstitial material disposed in at least some interstitial spaces between the first plurality of hard material grains and the second plurality of hard material grains formed from the first plurality of particles of hard material and the second plurality of particles of hard material; and
    selecting the first average particle size of the first plurality of particles of hard material and the second average particle size of the at least a second plurality of particles of hard material to cause the second plurality of hard material grains to have a second average grain size at least about one hundred fifty (150) times larger than a first average grain size of the first plurality of hard material grains.

6. The method of claim 5, further comprising selecting the first average particle size of the first plurality of particles of hard material and the second average particle size of the at least a second plurality of particles of hard material to cause the second average grain size of the second plurality of hard material grains to be between two hundred fifty (250) times and seven hundred fifty (750) times larger than the first average grain size of the first plurality of hard material grains.

7. The method of claim 6, wherein at least partially coating each particle of the first plurality of particles of hard material with the coating material comprises at least partially coating each particle of the first plurality of particles of hard material with at least one of nitrogen, a nitrogen compound, a carbonate-forming metal, a metal carbonate, a bicarbonate-forming metal, a metal bicarbonate, a carbide-forming metal, and a metal carbide.

8. The method of claim 5, further comprising selecting each particle of the first plurality of particles of hard material and each particle of the at least a second plurality of particles of hard material to comprise diamond.

9. The method of claim 8, wherein at least partially coating each particle of the first plurality of particles of hard material with the coating material comprises:
at least partially coating each particle of the first plurality of particles of hard material with a reagent material capable of reacting with carbon to form the coating material; and
reacting the reagent material with carbon atoms in or on each coated particle of the first plurality of coated particles of hard material to form the coating material.

10. The method of claim 5, further comprising selecting each particle of the first plurality of particles of hard material and each particle of the at least a second plurality of particles of hard material to comprise cubic boron nitride.

11. The method of claim 5, wherein sintering the first plurality of coated particles of hard material and the at least a second plurality of particles of hard material to form the polycrystalline hard material comprises subjecting the first plurality of coated particles of hard material and the at least a second plurality of particles of hard material to a high temperature/high pressure (HTHP) process.

12. The method of claim 11, wherein sintering the first plurality of coated particles of hard material and the at least a second plurality of particles of hard material to form the polycrystalline hard material comprises subjecting the first plurality of coated particles of hard material and the at least a second plurality of particles of hard material to a pressure greater than about five gigapascals (5.0 GPa) and a temperature greater than about 1,000° C.

13. The method of claim 12, wherein subjecting the first plurality of coated particles of hard material and the at least a second plurality of particles of hard material to a pressure greater than about five gigapascals (5.0 GPa) and a temperature greater than about 1,000° C. comprises subjecting the first plurality of coated particles of hard material and the at least a second plurality of particles of hard material to a pressure greater than about six and one half gigapascals (6.5 GPa) and a temperature greater than about 1,500° C. for less than about two minutes (2.0 min).

14. The method of claim 5, further comprising:
selecting the first average particle size of the first plurality of particles of hard material to cause the first average grain size of the first plurality of hard particle grains to be between about one nanometer (1 nm) and about one hundred fifty nanometers (150 nm); and
selecting the second average particle size of the at least a second plurality of particles of hard material to cause the second average grain size of the second plurality of hard particle grains to be between about five microns (5 μm) and about forty microns (40 μm).

15. The method of claim 5, further comprising forming the first plurality of hard particle grains to comprise between about one-half of one percent (0.5%) and about thirty percent (30%) by volume of the polycrystalline hard material.

16. The method of claim 5, further comprising catalyzing the formation of inter-granular bonds between grains of the first plurality of hard particle grains and the second plurality of hard particle grains.

17. A method of forming an earth-boring tool having at least one cutting element, wherein the at least one cutting element includes a polycrystalline compact, comprising:
preparing a plurality of nanoparticles of hard material for a subsequent sintering process, comprising:
selecting a coating material comprising at least one of a boride, a carbide, a nitride, a metal carbonate, a metal bicarbonate, and a non-catalytic metal; and
at least partially coating each nanoparticle of the plurality of nanoparticles of hard material with the coating material forming a plurality of coated nanoparticles of hard material;
sintering the plurality of coated nanoparticles of hard material to form a polycrystalline hard material comprising a plurality of hard particle grains formed from the plurality of coated nanoparticles of hard material, the plurality of hard particle grains being interspersed and inter-bonded to form the polycrystalline hard material, the coating material forming an interstitial material disposed in at least some interstitial spaces between the plurality of hard material grains formed from the plurality of coated nanoparticles of hard material;
forming a polycrystalline compact from the polycrystalline hard material;
disposing the polycrystalline compact on a substrate to form the at least one cutting element; and
joining the at least one cutting element to the earth-boring tool.

18. The method of claim 17, further comprising selecting each nanoparticle of the plurality of nanoparticles to comprise diamond.

19. The method of claim 18, further comprising selecting the coating material to comprise at least one of carbon nitride, carbon boride, a metal carbonate, a metal bicarbonate, and a metal carbide.

20. The method of claim 19, wherein at least partially coating each nanoparticle of the plurality of nanoparticles comprises:
at least partially coating each nanoparticle of the plurality of nanoparticles with a reagent material capable of reacting with carbon to form the coating material; and
reacting the reagent material with carbon atoms in or on each coated nanoparticle of the plurality of nanoparticles to form the coating material.

* * * * *